March 31, 1959  C. D. BOCK ET AL  2,880,388
ELECTRO-MECHANICAL RESOLVERS
Original Filed April 5, 1951
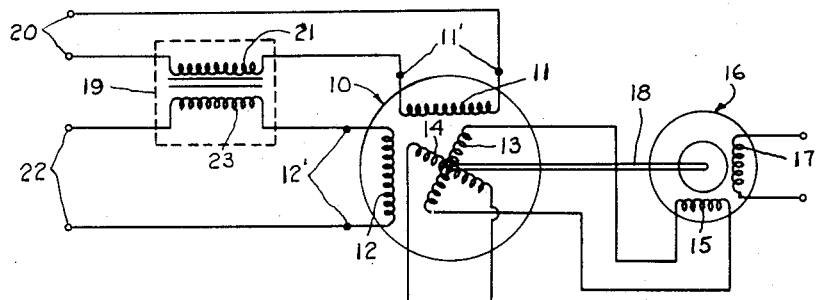
*Fig. 1.*
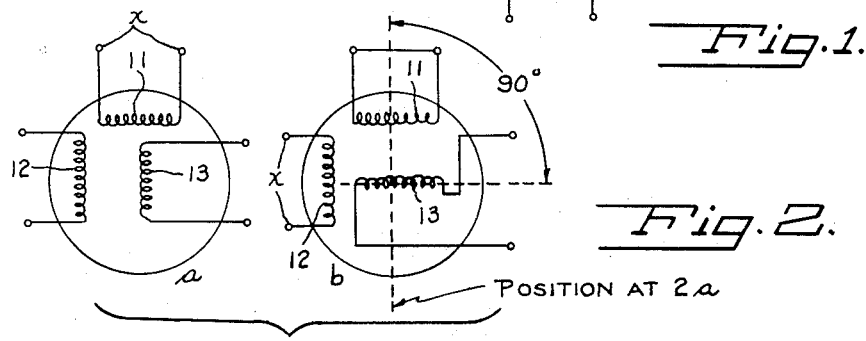
*Fig. 2.*
POSITION AT 2a
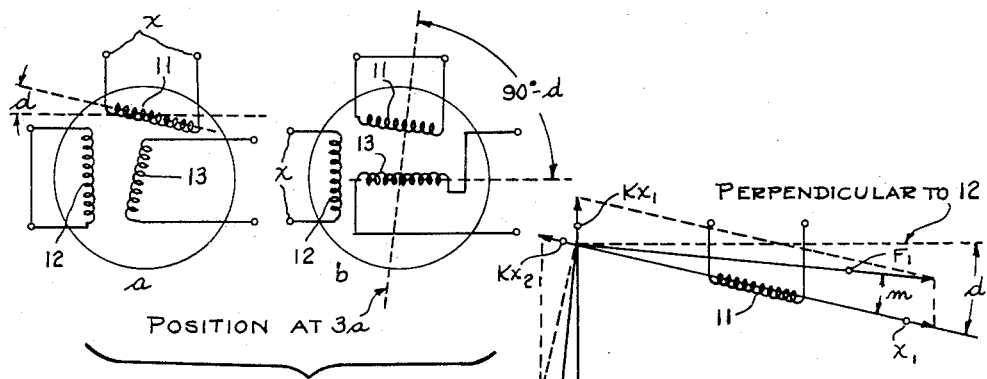
POSITION AT 3a
*Fig. 3.*
*Fig. 4.*
INVENTORS.
CHARLES D. BOCK
SIDNEY DAVIS
BY 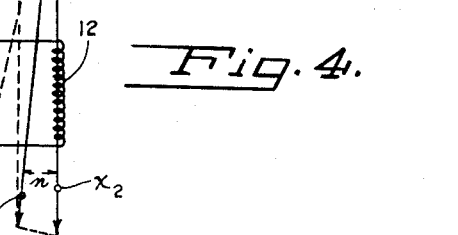
ATTORNEY.

United States Patent Office 2,880,388
Patented Mar. 31, 1959

2,880,388

ELECTRO-MECHANICAL RESOLVERS

Charles D. Bock and Sidney Davis, New York, N.Y., assignors to American Bosch Arma Corporation, a corporation of New York Continuation of application Serial No. 219,405, April 5, 1951. This application February 27, 1956, Serial No. 568,081

6 Claims. (Cl. 323—53)

This invention relates to electromechanical resolvers and has particular reference to resolvers having two substantially perpendicularly disposed primary windings and correction devices therefor.

This application is a continuation of our application Serial No. 219,409, filed April 5, 1951.

During the solution of fire control and other problems by the use of electromechanical resolvers it is frequently desirable to transform rectangular into polar coordinates. The method of electrically resolving two rectangular components into a resultant vector with an electromechanical resolver is described in Patent #2,465,624 issued March 29, 1949. In this method the two perpendicularly disposed primary (stator) windings are energized with voltages proportional to the given rectangular coordinates, $R \sin \theta$, $R \cos \theta$ while one secondary winding on the rotor energizes a motor connected to the rotor of the resolver. The motor drives the rotor until the said secondary winding is in the non-inductive position, whence the rotor is angularly displaced by an angle $\theta$ from its zero position and the voltage induced in the other secondary winding is proportional to R.

The accuracy of the solution is dependent on the accuracy of construction of the elements and the degree to which the known defects are neutralized. The present invention is concerned only with the error arising from a lack of perpendicularity in the magnetic axes of the primary windings and the means for neutralizing the effect thereof.

In accordance with the present invention the primary windings are inductively coupled together by an external mutual inductance of such value that the effective magnetic axes of the individual primary windings are displaced by exactly 90° from each other.

For a more complete understanding of this invention reference may be had to the accompanying diagrams in which:

Fig. 1 is a schematic wiring diagram of this invention showing the electrical connections between the external coupling and the resolver.

Figs. 2 and 3 illustrate the non-inductive positions of the resolver secondary for a perfect and imperfect resolver respectively as one primary is energized and the other is short circuited, and, Fig. 4 is a vector diagram depicting the operation of this invention.

Referring now to Fig. 1, an electro-mechanical resolver 10 having stator windings 11, 12 used as the primary windings and rotor windings 13, 14 used as secondary windings is connected in the usual manner to solve for R and $\theta$ when voltages proportional in magnitude to $R \cos \theta$ and $R \sin \theta$ are applied to terminals 11′ and 12′ of stator windings 11 and 12 respectively. One rotor winding 13 energizes control field winding 15 of two-phase motor 16, the main field winding 17 of which is energized by a constant alternating voltage in time quadrature with the control field excitation. Motor 16 drives shaft 18 and thereby drives the rotor of resolver 10 until the output of rotor winding 13 is zero and control field winding 15 is deenergized. As described in Patent 2,465,624 previously referred to, the displacement of shaft 18 from the zero position is $\theta$, and the output of rotor winding 14 is proportional to R.

Assuming that the resolver 10 is perfect, when a voltage $x$ is impressed across terminals 11′ and a short circuit is applied to terminals 12′, rotor winding 13 is driven to a position perpendicular to the magnetic axis of stator winding 11. This position corresponds to an angle $\theta$ equal to zero since $x \sin 0° = 0$ and $x \cos 0° = x$, and is illustrated in Fig. 2a.

If now the short circuit is removed from terminals 12′ and the voltage $x$ is applied thereto while terminals 11′ are short circuited, rotor winding 13 is driven to a position perpendicular to the magnetic axis of stator winding 12. In this position the rotor is displaced by 90° from the previous position as shown in Fig. 2b indicating correctly that $\theta = 90°$ since $x \sin 90° = x$ and $x \cos 90° = 0$.

If, however, the magnetic axes of the resolver primary windings, i.e. the stator windings 11, 12, are not perpendicular to one another the positions at null for the conditions above are not exactly 90° apart, as indicated in Figs. 3a and 3b, but are in error by an angle $d$, the angle by which the magnetic axis of winding 11 is displaced from the perpendicular to the magnetic axis of winding 12.

By shifting the effective magnetic axes of the stator windings 11, 12 the null positions for $\theta = 0°$ and $\theta = 90°$ are made to be 90° apart, as will be described, so that the error due to non-perpendicularity of the primary windings is neutralized.

This compensation is effected merely by externally coupling the primary windings through a mutual inductance 19. The $x \cos \theta$ signal is applied to terminals 20 which are connected in series with terminals 11′ and one winding 21 of mutual inductance 19. The $x \sin \theta$ signal is applied to terminals 22, which are connected in series with terminals 12′ and the other winding 23 of mutual inductance 19.

Now, a voltage $x \cos \theta$ applied to terminals 20 affects the magnetic flux produced by the stator winding 12, and a voltage $x \sin \theta$ applied to terminals 22 causes a similar change in the magnetic flux produced by stator winding 11.

Designating the amount of coupling between the circuits of windings 11, 12 as $k$, the flux produced by winding 11 is proportional to $x \cos \theta + kx \sin \theta$ while the flux produced by winding 12 is proportional to $x \sin \theta + kx \cos \theta$. In these expressions the value of $k$ includes the internal coupling between the windings 11, 12 themselves as well as the external coupling M, provided by mutual inductance 19. When $\theta$ is zero, so that the input signals to terminals 20, 22 are respectively $x$ and zero, the voltage applied to terminals 11′ is $x \cos 0° + kx \sin 0°$ or $x$ while the voltage applied to terminals 12′ is $\theta + kx \cos \theta$. In these expressions the value of $k$ includes tional magnetic fluxes to be produced by windings 11, 12, which are shown in Fig. 4 as flux vectors designated as $X_1$ and $kX_1$ respectively. The flux $X_1$ is in line with the magnetic axis of winding 11, displaced from the perpendicular to the magnetic axis of winding 12 by a small error angle $d$, while the flux $kX_1$ is in line with the magnetic axis of winding 12.

The value of coupling $k$ is of such magnitude and sense that the vector sum of $X_1$ and $kX_1$ i.e. the total flux $F_1$, is displaced by a small angle $m$ from the winding 11 toward the perpendicular to the winding 12, with $F_1$ lying in and defining the effective magnetic axis of stator winding 11.

Applying the signals $x$ and zero to terminals 22, 20 respectively, signifying that the angle $\theta$ is 90°, the voltage applied to terminals 11' may be expressed as $x \cos 90° + kx \sin 90°$ or $kx$ while the voltage applied to terminals 12' is $x \sin 90° + kx \cos 90°$ or $x$. These voltages cause proportional fluxes to be produced by windings 11, 12 which are shown in Fig. 4 and are designated as $kX_2$ and $X_2$ respectively. The resultant flux $F_2$ is displaced from the axis of winding 12 toward the perpendicular to the axis of winding 11 by an angle $n$ equal in magnitude to the angle $m$ above, and lies in the effective magnetic axis of winding 12.

The amount of magnetic axis shift, $m$ or $n$, is dependent on the magnitude of the coupling $k$. When $k$ is of such value that $m$ and $n$ are equal to $d/2$ it is evident that the effective magnetic axes of windings 11, 12 are displaced by exactly 90° and the error due to primary winding obliquity is removed.

The magnitude of $k$ is varied by regulating the value of the coupling M provided by the mutual inductance 19. In a preferred embodiment of this invention, the coupling M is adjusted by decreasing or increasing the reluctance of the flux path between coils 21 and 23 by adding or removing magnetic material in the flux path between the coils 21 and 23 as required.

Although the invention has been described and illustrated as providing correction for the non-perpendicularity of primary windings, its use may be extended to provide correction for secondary winding obliquity, if so desired. In this instance, however, the amount of mutual coupling necessary between the two secondary windings is dependent on the load as well as the error angle, since the operation of the invention depends on the current in the mutual inductance windings.

In general the output impedance of resolvers is standardized, so that in practice the amount of mutual coupling between windings need not be readjusted for each different use of the resolver.

We claim:

1. In a device of the character described, two pair of terminals for connection to separate signal sources, an electro-mechanical resolver having a pair of substantially perpendicularly disposed primary windings and a secondary winding, said primary and secondary windings being relatively rotatable, a first circuit including series connections between one of said pairs of terminals and one of said primary windings and a second circuit including series connections between the other of said pairs of terminals and the other of said primary windings, transformer means interposed in said series connections to provide coupling between said circuits, the current in said primary windings being in phase with each other.

2. In a device of the character described, two pair of terminals for connection to separate signal sources, an electro-mechanical resolver having a pair of substantially perpendicularly disposed primary windings and a secondary winding, said primary and secondary windings being relatively rotatable, a first circuit including series connections between one of said pairs of terminals and one of said primary windings and a second circuit including series connections between the other of said pairs of terminals and the other of said primary windings, transformer means interposed in said series connections to provide coupling between said circuits, the current in said primary windings being in phase with each other the value of said coupling being dependent on the angular error in the perpendicular relation of said primary windings.

3. In a device of the character described, two pair of terminals for connection to separate signal sources, an electro-mechanical resolver having a pair of substantially perpendicularly disposed primary windings and a secondary winding, said primary and secondary windings being relatively rotatable, a first circuit including series connections between one of said pairs of terminals and one of said primary windings and a second circuit including series connections between the other of said pairs of terminals and the other of said primary windings, transformer means interposed in said series connections to provide coupling between said circuits, the current in said primary windings being in phase with each other, the value of said coupling being such that the effective magnetic axes of the individual primary windings are displaced by exactly ninety degrees from each other.

4. In an electro-mechanical resolver, a pair of substantially perpendicularly disposed primary windings and a secondary winding, said primary and secondary windings being relatively rotatable, said primary windings being adapted to be connected to a source of current, a first circuit including one of said primary windings, a second circuit including the other of said primary windings, transformer means in said circuits to provide coupling between said circuits, the current in said primary windings being in phase with each other.

5. In an electro-mechanical resolver, a pair of substantially perpendicularly disposed primary windings and a secondary winding said primary and secondary windings being relatively rotatable, said primary windings being adapted to be connected to a source of current, a first circuit including one of said primary windings, a second circuit including the other of said primary windings, transformer means in said circuits to provide coupling between said circuits, the current in said primary windings being in phase with each other, the value of said coupling being dependent on the angular error in the perpendicular relation of said primary windings.

6. In an electro-mechanical resolver, a pair of substantially perpendicularly disposed primary windings and a secondary winding, said primary and secondary windings being relatively rotatable, said primary windings being adapted to be connected to a source of current, a first circuit including one of said primary windings, a second circuit including the other of said primary windings, transformer means in said circuits to provide coupling between said circuits, the current in said primary windings being in phase with each other, the value of said coupling being such that the effective magnetic axes of the individual primary windings are displaced by exactly ninety degrees from each other.

References Cited in the file of this patent

UNITED STATES PATENTS

| | | |
|---|---|---|
| 1,050,444 | Fynn | Jan. 14, 1913 |
| 2,713,143 | Bock | July 12, 1955 |
| 2,740,935 | Statsinger | Apr. 3, 1956 |

FOREIGN PATENTS

| | | |
|---|---|---|
| 356,924 | Great Britain | Sept. 17, 1931 |